Sept. 15, 1959      D. M. GRAHAM      2,904,227

METERING DEVICE FOR SQUEEZE-TYPE CONTAINER

Filed May 6, 1957      2 Sheets-Sheet 1

INVENTOR.
DEAN M. GRAHAM

BY *Robert E. Winham*

ATTORNEY

Sept. 15, 1959  D. M. GRAHAM  2,904,227
METERING DEVICE FOR SQUEEZE-TYPE CONTAINER
Filed May 6, 1957  2 Sheets-Sheet 2

INVENTOR.
DEAN M. GRAHAM
BY
ATTORNEY

United States Patent Office 2,904,227
Patented Sept. 15, 1959

2,904,227

METERING DEVICE FOR SQUEEZE-TYPE CONTAINER

Dean M. Graham, Kalamazoo, Mich., assignor to The Upjohn Company, Kalamazoo, Mich., a corporation of Michigan Application May 6, 1957, Serial No. 657,122

7 Claims. (Cl. 222—207)

This invention relates to a dispensing cap for a container and, more particularly, relates to a device intended primarily for use with plastic squeeze bottles and adapted for dispensing a closely measured quantity of fluid therefrom.

Devices for dispensing metered amounts of fluid from containers of various kinds have been known in the past but they have not been entirely satisfactory for a number of reasons. Foremost among these reasons is the structural complexity which is usually a characteristic of such dispensing devices. Such complexity in construction results in high manufacturing cost and, usually, relatively unsatisfactory performance and accuracy. Inasmuch as medicament containers, particularly of the squeeze bottle type, are made in very large quantities, it is apparent that even a slight saving in manufacturing cost per unit will result in extremely large savings in the manufacturing operation. Further, in many presently known types of dispensing devices of this general nature, the mechanism does not maintain a sufficiently precise control over the quantity of fluid dispensed to be acceptable for dispensing medicaments and, accordingly, a more accurate dispensing device is desired.

Accordingly, the objects of the invention are:

(1) To provide a dispensing device for a container characterized by simplicity of construction;

(2) To provide a dispensing device for a container which can, if desired, be readily molded entirely from plastic material by compression or injection molding methods;

(3) To provide a dispensing cap for a container particularly adapted to operate effectively with a container of the sqeeze bottle type;

(4) To provide a dispensing cap for a container which will dispense a predetermined, metered amount of fluid from the container;

(5) To provide a dispensing cap for a squeeze bottle type of container which will dispense a metered amount of fluid from the container and will do so upon merely inverting the container and squeezing the sides thereof toward each other;

(6) To provide a dispensing cap for a container which will be sufficiently sturdy in construction that it will operate successfully for a long period of use without loss in the accuracy of the quantities of material metered thereby;

(7) To provide a dispensing device of the general character aforesaid, which can be made, assembled and mounted on a container for use therewith at an extremely low cost; and (8) To provide a dispensing head for a container, of the general character aforesaid, which can be readily installed onto a container after the filling thereof, with a minimum of inconvenience.

Other objects and purposes of the invention will be apparent to persons acquainted with devices of this general type upon reading the following disclosure and inspecting the accompanying drawings.

*General description*

Figure 1:
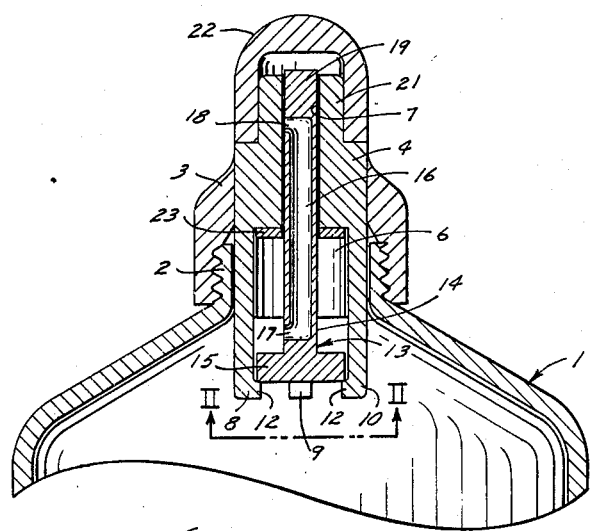
Figure 1 shows a central, sectional view of the upper end of a container of the squeeze bottle type, together with the dispensing apparatus and a protecting member therefor.
Figure 3:
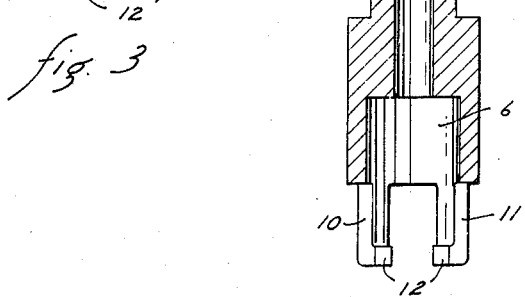
Figure 3 is a sectional view taken on the line III—III of Figure 2.

In general, the dispensing apparatus includes a body member receivable within the container and defining a metering chamber. A piston is movable through the metering chamber and is adapted to dispense a metered quantity of fluid therefrom. The piston is comprised of a piston head slidably receivable within the metering chamber and a fluid-conducting piston rod, which piston rod, in its retracted position, blocks communication between the metering chamber and the exterior of the container and which, in its extended position, permits such communication. Further, in moving from a retracted to an extended position, said piston positively impels fluid from within said metering chamber through a conduit within said fluid-conducting piston rod and outwardly from the container. The body member has side openings permitting entry of fluid to be dispensed from the container into the metering chamber and also has an opening for receiving the fluid-conducting piston rod therethrough.

*Detailed description*

For the purpose of convenient reference, certain terminology will be used herein, but it will be understood that such terminology is for convenience only and has no limiting significance. Particularly, the terms, "inward," "outward," and derivatives thereof, will refer to directions toward and away from, respectively, the geometric center of the container. The terms, "upward," "downward," and derivatives thereof, will refer to the position of the apparatus as appearing in the drawings to which reference is made in any given instance. The term, "squeeze bottle" will be understood to refer to a type of bottle which will normally hold a predetermined shape, but whose side will yield sufficiently to pressure imposed thereon, usually manually by the user, to cause said sides to move toward each other. Such bottles are commonly used for dispensing many types of fluids, particularly including cosmetics and medicaments, and are commonly made of polyethylene plastic material. However, it will be understood that the dispenser of the invention is by no means limited to use with squeeze bottles, but that other types of containers capable of imposing a pressure on the fluid within the container at the will of the user are capable of employment therewith, and that the use of squeeze bottles, as disclosed herein, is only for purposes of illustration.

Figure 2:
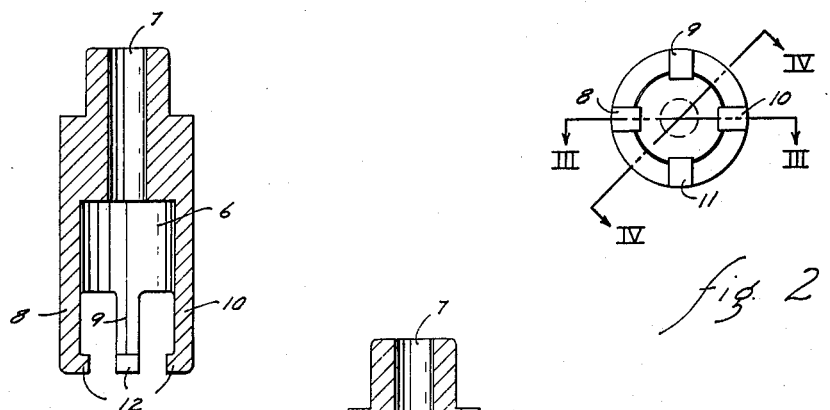
Figure 2 is a view along the line II—II of Figure 1 of the cylinder portion of the dispensing apparatus.
Figure 4:
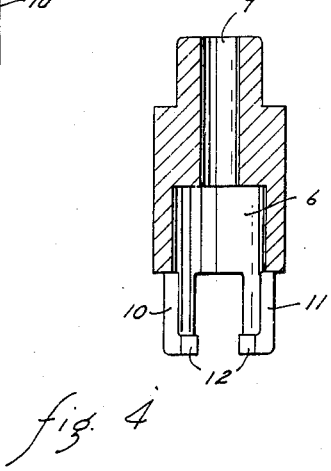
Figure 4 is a sectional view taken on the line IV—IV of Figure 2.

Referring now to Figure 1 of the drawings, the container 1 is adapted for holding the fluid to be dispensed and is capable of responding to manually imposed pressure for imposing a pressure on the fluid contained therein. Such a container may be a squeeze bottle, as above defined. The upper end of the container 1 has a neck portion or boss, 2 which is preferably threaded for reception of a shroud 3. A dispenser cylinder 4 is received tightly within the shroud 3. The cylinder 4 includes a sleeve portion extending inwardly therefrom for defining a metering chamber 6 at one end thereof and lying substantially within the container. A dispensing passageway 7 extends from the metering chamber 6 to, and through the upper (Figure 1) end of the cylinder 4. A cage-like structure, here comprising a plurality of, as four, guiding fingers 8, 9, 10 and 11 (Figure 2) extends from the lower end of the metering chamber downwardly (Figure 1) for the reception and guidance of the piston, as hereinafter appearing. A small protrusion 12 is provided on the end of each of said fingers for reasons appearing hereinafter.

The piston 13 (Figure 1) is provided with a rod 14 and a head 15. The head 15 is of a diameter to fit snugly, but slidably, between said fingers and also snugly, but slidably, within the wall defining the chamber 6, the inner surfaces of said fingers being a continuation of the inner surface of the wall defining said chamber 6. The rod 14 of said piston is of a diameter to fit snugly, but slidably, withing the passageway 7. The rod 14 has a longitudinally extending conduit 16 therethrough. The conduit 16 has a lower port 17 extending sidewardly through the rod 14 closely adjacent to the head 15 and it has an upper, sidewardly extending port 18 close to, but spaced an appreciable distance from, the upper end of said rod 14. The portion 19 of the rod 14 extending beyond the port 18 is as short as possible, but is sufficient that, when the piston 13 is in the position shown in Figure 1, the port 18 will be sufficiently inward from the outer end of the conduit 7 so that there will be no reasonable likelihood of leakage of fluid from said port 18 to the exterior of the cylinder 4.

The cylinder 4 may be recessed, if desired, to provide a boss as indicated at 21 for the reception of a suitable protective cap 22, which cap may be held with respect to said cylinder 4 in any convenient manner, as by a friction fit or by threading. A spacer 23 may be provided at the upper (Figure 1) end of the chamber 6, for reasons appearing hereinafter.

It will be recognized that by known molding techniques, such as the use of flexible cores and molds, the parts comprising the metering and dispensing device may be readily molded from plastic materials by either injection or compression procedures.

*Operation*

It is believed that the operation will be readily understood from the foregoing description and by an inspection of the drawings, but it will be reviewed further in the interests of a full and complete understanding of the invention.

Figure 5:
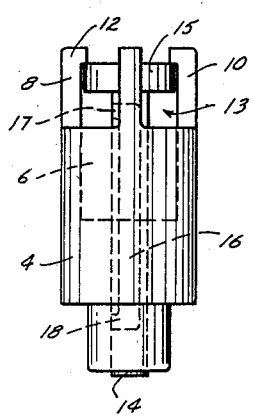
Figure 5 shows the cylinder and piston portion of the dispensing apparatus in inverted position for dispensing fluid from the container, with the cylinder and piston in the same position with respect to each other which they would occupy during the filling operation of the metering cylinder.
Figure 6:
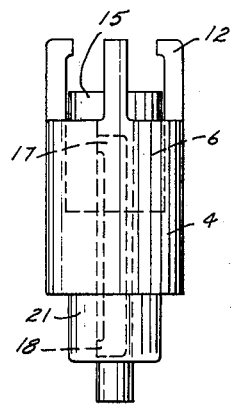
Figure 6 is a view similar to Figure 5, with the parts occupying an intermediate, instantaneous position during the dispensing operation.
Figure 7:
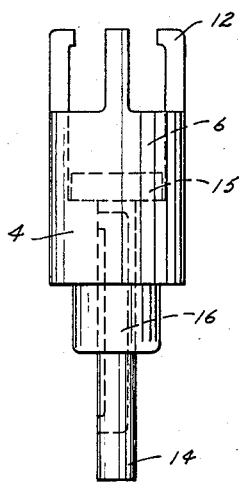
Figure 7 is a view similar to Figure 5, with the parts in the position they would occupy at the completion of the dispensing operation.

Referring primarily to Figures 5, 6 and 7, which illustrate the metering and dispensing portion of the apparatus, it will be understood that the piston 13 is first fully retracted into the container so that its innermost surface lies against the projections 12. This will be done automatically when the cap 22 is put into place, as appearing in Figure 1, or it may be done by the finger of the user where repeated dosages are dispensed. It will be observed that, with the material dispensed from the container being discharged through the sidewardly opening port 18, the contact of the user's finger with the end of the rod 14 will not contaminate the fluid.

At this point, the container may be inverted so that the dispensing and metering parts occupy the position shown in Figure 5. In this position, the fluid to be dispensed will flow under the piston head 15 and between the fingers 8, 9, 10 and 11 into the chamber 6 and will fill said chamber. Simultaneously, said fluid will flow through the port 17 to fill the conduit 16. The user will normally allow sufficient time for this to happen, but it will be recognized that filling of chamber 6 and conduit 16 will happen very quickly and the apparatus will be ready to dispense liquid practically as soon as it reaches its inverted position.

If pressure is then applied to the material within the container 1, such as by squeezing the sides of the bottle, if the container 1 is a squeeze bottle as above defined, such pressure will act on both the inner (upper as appearing in Figures 5, 6 and 7) and outer (lower as appearing in Figures 5, 6 and 7) surfaces of head 15 of the piston. Since the cross-sectional area of the outer surface is less than the cross-sectional area of the inner surface by an amount equal to the cross-sectional area of rod 14, the force on the inner surface of the head 15 will predominate and will move said piston outwardly until the head enters into the chamber 6. This position is shown in Figure 6. At this point, the head 15 will fit snugly against the walls defining said chamber and the fluid within said chamber will be unable to escape in any appreciable quantity past said head and back into said container. With the closing off of the openings between the fingers 8, 9, 10 and 11, the pressure within the container now acts entirely on the upper (inner) surface of said piston head 15 and it continues to move outwardly. As the piston 13 moves outwardly, the fluid within the chamber 6 is driven through port 17, through the passageway 16 and is discharged through the port 18. Figure 7 shows the piston as it reaches the end of the chamber 6 and all of the material therein has been driven into, or through, the conduit 16.

With most fluids of low enough viscosity to be appropriate for use with this dispenser, the fluid will drain out of the passageway 16 through the port 18 sufficiently that very little will remain in said passageway. Thus, an accurately measured quantity is discharged each time the dispensing apparatus is operated. In actual embodiments of the invention, it has been found that a container equipped with the dispenser described above will dispense fluids having approximately the viscosity of light oil, with an error of only plus or minus about 2%. For example, U.S.P. glycerine was dispensed with an error of only plus or minus 1.8%.

While the embodiment of the invention herein illustrated and described has been designed to deliver approximately 1 cc. of fluid with each actuation of the piston 13, it will be recognized that the device may be readily modified to a wide range of sizes and may be adapted for the dispensing of a wide variety of fluids.

Where the metering chamber is designed for measuring a certain quantity of fluid and it is thereafter desired to dispense less than such quantity, one or more of the spacers 23 may be placed in the chamber 6 against the upper (outer) wall thereof. The spacers occupy a predetermined volume of space within the chamber and thus lower the capacity thereof correspondingly. The spacers will usually fit closely within the chamber 6 and will have a central opening for slidably receiving the rod 14.

Although the above mentioned drawings and description refer to a particular, preferred embodiment of my invention, it is not my intention, implied or otherwise, to eliminate other variations or modifications, which do not depart from the scope of the invention, unless specifically stated to the contrary in the hereinafter appended claims.

I claim:

1. A device for dispensing a metered amount of fluid, adapted for mounting upon the outlet for a container, comprising in combination: a closure member securable on said container for closing the outlet thereof, said closure member including means defining a metering chamber positioned within said container and also defining openings communicating with said metering chamber for permitting fluids within said container to enter into said metering chamber, said closure member also having a passageway of smaller cross-sectional area than said metering chamber extending outwardly from said metering chamber; a piston having a piston head of substantially the same cross-sectional area of said metering chamber and positioned for sliding movement within said metering chamber, the thickness of said piston head being substantially less than the length of said metering chamber, said piston head being movable between a position where said openings communicate with said metering chamber, through a position where said piston head closes off communication between said openings and said metering chamber, to a position for expelling fluid from said metering chamber, said piston also having a piston rod extending outwardly from said piston head, said piston rod being of smaller cross-sectional area than said metering chamber and said piston head and being of substantially the same cross-sectional area as said passageway and being slidably received through said passageway, said piston rod having an opening extending longitudinally therethrough, the inner end of said piston rod opening communicating with said metering chamber adjacent said piston head, the outer end of said piston rod opening being adapted to permit discharge of fluid from said metering chamber outwardly of the closure member.

2. A device for dispensing a metered amount of fluid, adapted for mounting upon the outlet of a container, comprising in combination: a cap member securable on said container for closing the outlet thereof, said cap member including inextensible means defining a constant volume metering chamber positioned within said container and also defining openings communicating with said metering chamber for permitting fluids within said container to enter into said metering chamber, said cap member having a cylindrical passageway of smaller cross-sectional area than said metering chamber extending outwardly thereof through the outer end wall of said metering chamber; a piston having a piston head of substantially the same cross-sectional area as said metering chamber and being freely slidable through said metering chamber, the thickness of said piston head being substantially less than the length of said metering chamber, said piston head being movable between a position where said openings communicate with said metering chamber, through a position where said piston head closes off communication between said openings and said metering chamber, to a position where said piston head lies adjacent said outer end wall of said metering chamber so that all of the contents of said metering chamber are expelled therefrom, said piston having a piston rod extending outwardly from said piston head, said piston rod being of smaller cross-sectional area than said metering chamber and said piston head and being of substantially the same cross-sectional area as said passageway and being slidably received through said passageway and sealingly contacting the wall thereof, said piston rod having an opening extending longitudinally therethrough, the length of said opening being substantially equal to the length of the metering chamber plus the length of said passageway so that the inner end of said opening enters said metering chamber when the outer end exits from said passageway, the inner end of said opening communicating with said metering chamber adjacent said piston head and the outer end of said piston rod opening being movable through, and outwardly of, said passageway, said piston rod being of such length that said outer end of its opening is positioned outwardly of said cap member when said piston head moves through said metering chamber.

3. A device for dispensing a metered amount of fluid, adapted for mounting upon the outlet of a container, comprising in combination: a cap member securable on said container for closing the outlet thereof, said cap member having an imperforate, inextensible sleeve defining a metering chamber positioned within said container, said cap member also having a plurality of spaced guide fingers extending inwardly from the inner end of said sleeve, said metering chamber having an outer end wall; means defining an elongated passageway extending through said outer end wall of said metering chamber; a piston having a piston head positioned for free sliding movement through said metering chamber and between said guide fingers, said piston head being movable between a terminal position thereof wherein said piston is located adjacent the inner end of said guide fingers with openings being provided thereby between said fingers whereby fluid may enter into said metering chamber from said container, through a position where said piston head closes off the open inner end of said metering chamber, to a position wherein said piston lies adjacent the outer end wall of said metering chamber, said piston having a piston rod slidably movable through said passageway, said piston rod having an opening extending longitudinally therethrough and the inner end of said piston rod opening communicating with said metering chamber adjacent said piston head and its outer end movable through, and outwardly of, said passageway, said piston rod being of such length that the outer end of its opening is positioned outwardly of said cap member when said piston head moves through said metering chamber.

4. A device for dispensing a metered amount of fluid, adapted for mounting upon the outlet of a squeeze-type container, comprising in combination: a closure member securable on said container for closing the outlet thereof, said closure member having an imperforate, inextensible, sleeve defining a metering chamber positioned within the upper end of said container, a plurality of guide fingers extending inwardly of said container from the inner end of said metering chamber, and defining a cage having open side and end walls whereby fluid within said container may move through the walls of said cage, said closure member also having a passageway extending outwardly thereof from the upper wall of said metering chamber; a piston having a piston head positioned for free sliding movement within said metering chamber and within said cage, said piston head being movable between a terminal position wherein said piston head rests on the lower end of said cage so that fluid within said container may move through the open side walls of said cage into said metering chamber, through a position wherein said piston head closes off the open inner end of said metering chamber, to a position wherein said piston head lies adjacent the upper end wall of said metering chamber, said piston being movable through the aforesaid positions in response to squeezing of the bottle, which causes fluid therewithin to act upon the inner surface of said piston head, said piston also having a piston rod slidably receivable through said passageway, said piston rod having an opening extending longitudinally therethrough and having its inner end communicating with said metering chamber adjacent said piston head, the outer end of said piston rod opening being movable through, and outwardly of, said passageway, said piston rod being of such length that the outer end of its opening is positioned outwardly of said closure member when said piston head moves through said metering chamber.

5. A device for dispensing a metered amount of fluid, adapted for mounting upon a squeeze-type container having an externally threaded outlet opening, comprising in combination: an internally threaded cap member, securable on said outlet opening, said cap member having an imperforate, inextensible sleeve defining a substantially cylindrical metering chamber positioned within the upper end of said container, said metering chamber having an open inner end and a closed upper end wall; a plurality of guide fingers extending inwardly from the inner end of said metering chamber, said guide fingers having projections thereon extending toward the axis of said metering chamber but being spaced therefrom, said guide fingers defining a cage having open side and end walls; an upwardly extending boss on the upper end of said cap member; a passageway extending outwardly from the upper wall of said metering chamber through said cap member and through said boss; a piston having a piston head positioned for free sliding movement within said metering chamber and for guided movement within said cage, said piston head being movable between a terminal position where it rests upon said projections on said guide fingers and thereby defines openings through the open side walls of said cage providing communication between said container and said metering chamber whereby fluid in said container may enter into said metering chamber, through a position where said piston head closes off communication between said container and said metering chamber, to a position adjacent the upper end wall of said metering chamber, said piston being movable through the aforementioned positions in response to squeezing of said container which causes fluid therewithin to move through the open end of said cage to act upon the inner surface of said piston head and urge it outwardly of said container, said piston having a piston rod slidably receivable through said passageway, said piston rod having an opening extending longitudinally therethrough, the inner end of said opening communicating with said metering chamber adjacent said piston head, the outer end of said opening being movable through, and outwardly of, said passageway, said piston rod being of such length that the outer end of its opening is positioned outwardly of said cap member when said piston head moves through said metering chamber; and a protective cap member receivable over said boss for preventing movement of said piston rod.

6. A device for dispensing a metered amount of liquid, comprising: a bottle having flexible, resilient, side walls and having an outlet passage; a metering trap in said bottle adapted to receive a measured amount of liquid; a closure member slidably movable through said outlet passage and adapted to open or close said passage; a dispensing passageway extending from said trap to said outlet passage; means responsive to pressure engendered by squeezing said bottle to move said closure member to a position where said outlet passage is open; and means slidable within said metering chamber and operative on further squeezing of said bottle to discharge the contents of said metering chamber through said passageway.

7. A device for dispensing a metered amount of liquid, comprising: a bottle having flexible, resilient, sidewalls and an outlet passage; a metering trap in said bottle adapted to receive a measured amount of liquid; a closure rod slidably movable longitudinally through said outlet passage, said closure rod having a longitudinally extending passageway therethrough, said passageway being closed off at its outer end when said rod is in its inner position and being open at its outer end when said rod is in its outer position; a dispensing conduit extending from said trap to the inner end of said passageway; means responsive to pressure engendered by squeezing said bottle to move said closure rod to its outer position; and means slidable within said metering chamber and operative on further squeezing of said bottle to discharge the contents of said metering chamber through said passageway.

References Cited in the file of this patent

UNITED STATES PATENTS

| 416,435 | Benner | Dec. 3, 1889 |
| 1,570,900 | Lieberthal | Jan. 26, 1926 |
| 2,718,987 | Kimball | Sept. 27, 1955 |

FOREIGN PATENTS

| 861,066 | Germany | Dec. 29, 1952 |